May 8, 1934.　　　　C. A. CAMPBELL　　　　1,957,692
AIR BRAKE
Filed June 29, 1931　　　2 Sheets-Sheet 1
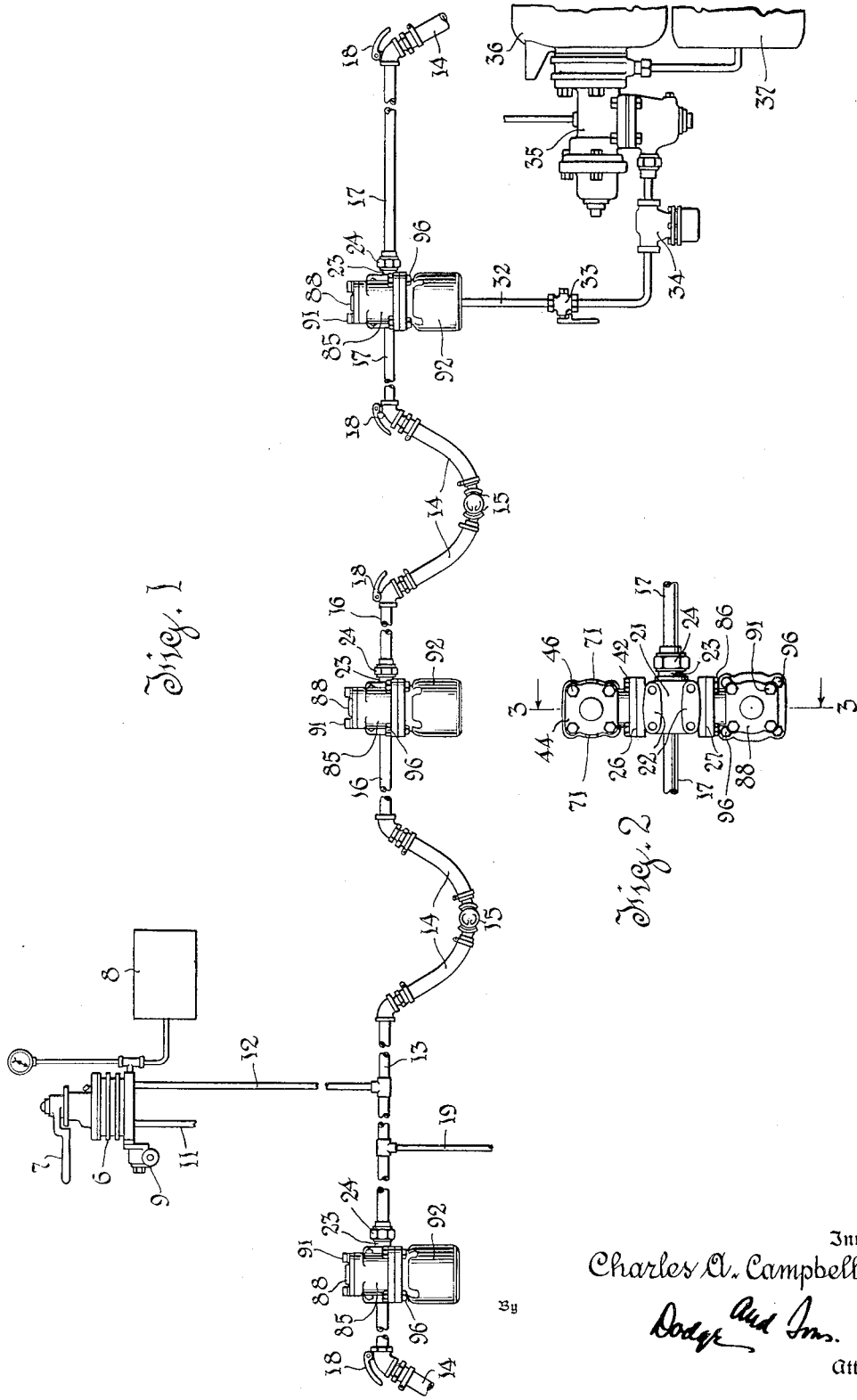
Inventor
Charles A. Campbell
By Dodge and Sons
Attorneys May 8, 1934.  C. A. CAMPBELL  1,957,692
AIR BRAKE
Filed June 29, 1931   2 Sheets-Sheet 2
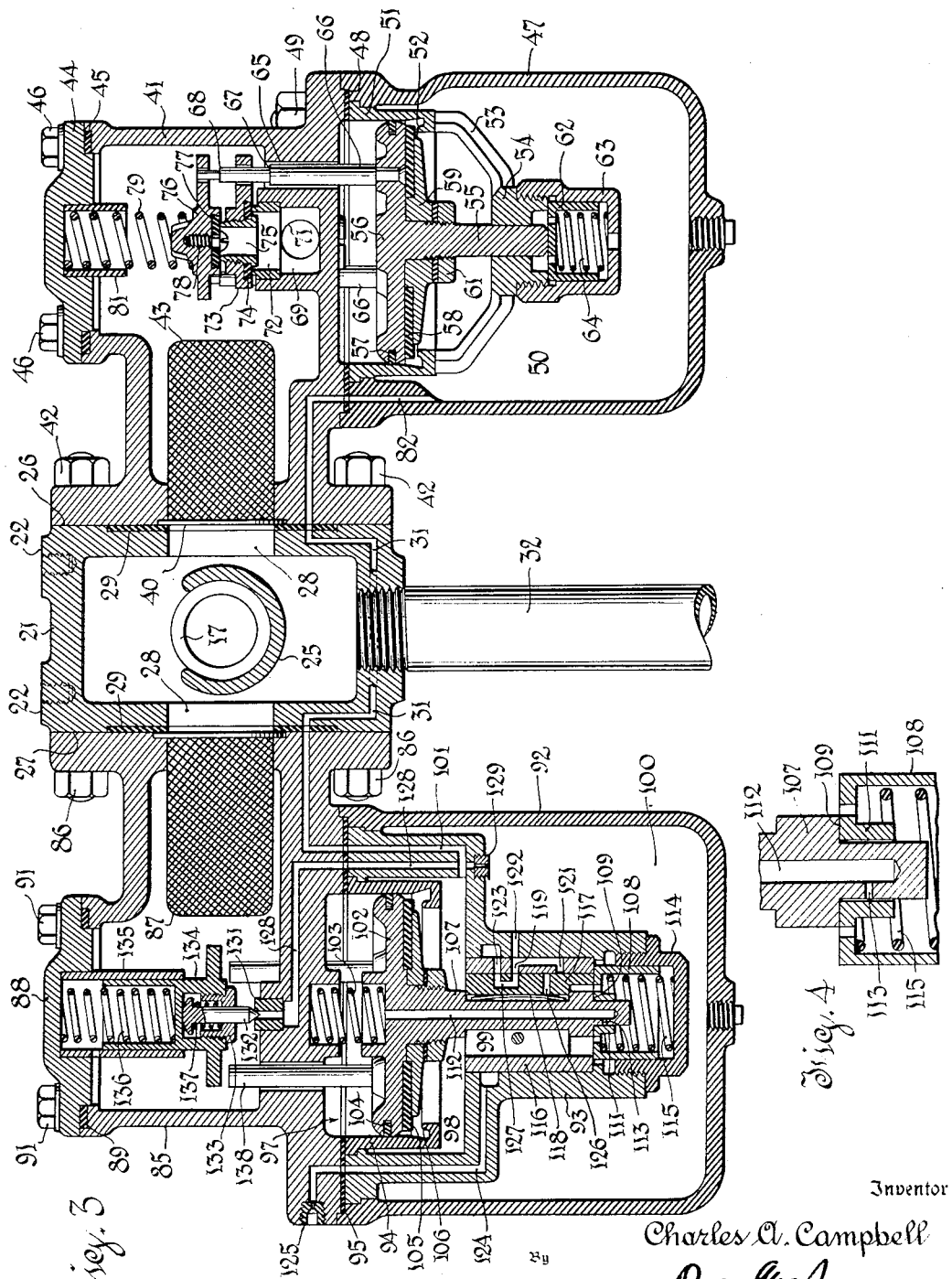
Inventor
Charles A. Campbell
By Dodge and Sons
Attorneys Patented May 8, 1934

1,957,692

UNITED STATES PATENT OFFICE 1,957,692

AIR BRAKE

Charles A. Campbell, Watertown, N. Y., assignor to The New York Air Brake Company, a corporation of New Jersey Application June 29, 1931, Serial No. 547,761

38 Claims. (Cl. 303—81)

This invention relates to air brakes, and particularly to means for accelerating service brake pipe reductions and emergency brake pipe reductions, and capable of functioning wholly independently of the response of triple valves.

In conventional air brake practice, quick service venting and emergency venting are both effected by response of the triple valve. As the triple valve is usually located at the end of a branch pipe, response of the triple and the effect of venting upon brake pipe pressure are each delayed. Furthermore, conventional triple valves are of the slide valve type and hence subject to considerable friction with attendant tendencies toward sluggish action.

Another familiar limitation in quick service venting in triple valves of conventional types, is a tendency toward recurrent venting as the result of pressure waves or surges in the brake pipe. Unless the capacity of the service venting is curtailed to a point at which it is relatively ineffective, recurrent venting will frequently cause brake pipe pressure to escape control by the engineer's brake valve. The effect is a full service (equalized) application when only a light reduction was made by the engineer and only a light application was intended.

The present invention produces a service venting mechanism, and an emergency venting mechanism, each functionally independent of the other, and both wholly independent of the triple valve. Though functionally independent of each other, both venting mechanisms are actuated by pressure fluid in a single balancing chamber or reservoir, thus minimizing reservoir volume necessary for the two functions.

Independence from the triple valve allows the mechanism to be so arranged that venting occurs directly from the brake pipe in both service and emergency, and both mechanisms are directly subject to brake pipe pressure, without the interposition of any branch pipe. This secures immediate response.

Both vent valves are of the poppet type ensuring free action and full opening, and simplifying design to secure a safe pressure reduction rate interval between those reductions which produce service rate venting and those which produce emergency venting.

Service venting is controlled so that while it may be repeated, it cannot recur at such short time intervals that repeated response may synchronize with pressure waves or surges in the brake pipe.

Direct response to brake pipe reductions, together with direct venting from the brake pipe, ensure rapid action in service, without need for excessive venting flow, thus increasing the rapidity of propagation of service reductions, sharpening the fineness of control, and further reducing the risk of loss of control.

Generally stated, I make use of two poppet type vent valves with actuating pistons, each piston directly subject to brake pipe pressure on one side and to balancing chamber pressure on the other. A single balancing chamber serves for both pistons. Movement of one of the pistons (preferably the service vent piston) in response to changes of brake pipe pressure, serves to vent the balancing chamber at a service rate during service reductions and controls the charging of the balancing chamber during release.

The two actuating pistons are so biased that the service vent opens in advance of the emergency vent, and a safe margin is preserved against the operation of the emergency vent until an emergency rate of brake pipe reduction is initiated by means other than the service vent valve.

The emergency vent valve discharges to atmosphere, but the service vent discharges to a measuring chamber. After each service venting the measuring chamber is discharged to atmosphere but at a restricted rate, so that, in rapid successive service venting actions the measuring chamber is so nearly charged that service venting is smothered.

Under high releasing brake pipe pressures, the balancing chamber is connected with the measuring chamber by motion of the vent valve mechanism to restricted recharge position. This reduces the tendency toward overcharge of the balancing chamber and reduces the effectiveness of service venting for a period long enough to ensure that the service vent will not cause reapplication following overcharge.

The preferred embodiment of the invention will now be described with reference to the accompanying drawings, in which,—

Fig. 1 is a partial diagrammatic view of the brake pipe on the locomotive, tender and one car, showing how the invention is applied.

Fig. 2 is a fragmentary plan view of the vent valve mechanism.

Fig. 3 is an enlarged section on the line 3—3 of Fig. 2.

Fig. 4 is a fragmentary view of a portion of Fig. 3 on an enlarged scale.

Referring first to Fig. 1, an engineer's brake valve of the equalizing discharge type is indicated at 6 and is manually actuated by means of the handle 7. The equalizing reservoir appears at 8 and the feed valve at 9. Air is supplied to the engineer's brake valve from the main reservoir (not shown) through the main reservoir pipe 11, and a branch pipe 12 leads from the brake valve 6 to the brake pipe 13 on the locomotive. The brake pipe is connected by hose 14 and couplings 15 with the tender brake pipe 16. This in turn is connected by similar hose 14 and couplings 15 with the car brake pipe 17, and so on through the train, as usual. Angle cocks 18 are provided according to current practice, and a branch 19 leads from the locomotive brake pipe 13 to the automatic valve (not shown) customarily used to control the engine and tender brakes.

The automatic valve just mentioned would ordinarily be of the well known "LT" or "ET" type and its form is immaterial. In the diagram, particularly as to the locomotive, many accessory valves and much piping are omitted from the diagram in the interest of clearness. The invention imposes no limitation as to the form of such parts, and they are not directly involved.

On the locomotive and tender and on each car is a brake pipe vent valve mechanism having both service and emergency venting functions, and forming the subject matter of the present application. On the engine and tender the vent valve mechanism is not associated with any triple valve, there being no triple valve on the locomotive or the tender while the automatic valve on the locomotive controls the brakes on both locomotive and tender. On the cars it is convenient to mount the vent valve mechanism on a modified form of branch pipe T, to which the branch pipe leading to the triple valve is connected, and this arrangement is shown in the drawings.

It should be understood, however, that the vent valve mechanism is wholly independent of the triple valve, and performs only brake-pipe venting functions, so that on long cars more than one vent valve mechanism might be found advisable, each located without any necessary limitations as to the position of the triple valve.

The modified branch pipe T, above mentioned and about to be described, forms part of the subject matter of my application Serial No. 560,806 filed September 2, 1931 and is not claimed herein.

Inserted in the brake pipes 13, 16 and 17, are modified branch pipe T's, each having a hollow body 21 (see Figs. 2 and 3) with bolting pads 22 by which it is mounted on the framing of the locomotive, tender or car, as the case may be.

The body 21 is formed on its opposite ends with threaded openings to receive the brake pipe, for example, the brake pipe 17 on a car. For convenience in assembly a nipple 23 and union 24 are used for one connection. An important feature is that the portions of the brake pipe, for example, the brake pipe 17, are alined with each other, as indicated in Figs. 1 and 2.

Extending across the interior of the chamber within the body 21 and forming a continuation of the two portions of the brake pipe is a trough-like member 25 which is open at its top and which serves to reduce the tendency of moisture and particles of scale to discharge into the body 21. It follows from this construction that a continuous and uninterrupted flow path is afforded through the body 21 and that this path is accurately alined with the bore of the brake pipe 17. This construction is favorable to the rapid propagation of pressure variations throughout the length of the train.

The two sides of the body 21 are formed with mounting faces 26 and 27 for the emergency vent valve and the service vent valve, respectively. Both mounting faces have central apertures 28 which connect with the interior of the body 21 and thus with the brake pipe. These apertures are each surrounded by a gasket 29 compressed in recesses formed in the mounting faces.

There is also a passage 31 which is formed in the body 21 and which terminates at its opposite ends in the area which receives the gaskets 29, the passage 31 communicating through openings formed in the gasket with mating ports in the two vent valve structures, which will hereafter be described. The passage 31 does not communicate with the interior of the brake pipe or with the interior of the body 21.

At the bottom of the body 21 is a threaded aperture which normally receives the branch pipe 32. On locomotives and tenders, and in any other case where no branch pipe is to be connected, the aperture is plugged. Branch pipe 32 leads through a cut-out cock 33 and dust separator 34, both of ordinary form, to a triple valve 35. This triple valve is preferably what is known as a plain triple valve, that is to say, it is of the type which performs no service venting function and no emergency venting function. Such functions would be superfluous in view of the venting action of the mechanism mounted on the body 21.

The particular type of triple valve is, however, immaterial to the present invention. There has been chosen for illustration a valve of the double reservoir type, that is, one making use of an auxiliary reservoir 36 and a supplemental reservoir 37. Such a valve may, in accordance with prior practice, be of the type which uses auxiliary reservoir air alone for service applications and uses both auxiliary and supplemental reservoir air in emergency applications, but it is immaterial whether there be one reservoir or more, so far as the present invention is concerned.

Refer now particularly to Fig. 3, which is a diagrammatic view to the extent that the ports are drawn as if they were all located in a single plane. This arrangement is chosen merely to simplify explanation.

The emergency vent valve, which in many respects conforms to the construction described and claimed in my prior application Serial No. 470,755, filed July 25, 1930, continued as application Serial No. 563,619, filed September 18, 1931 and hence is not claimed per se in the present application, is mounted on the face 26. There is an upper body or housing 41 which is provided with a flange bolted, as indicated at 42, on the mounting face 26. It is provided with an aperture registering with the aperture 29 in the mounting face 26, and in this aperture is mounted a strainer 43 which has a flange 40 confined in an annular recess provided to receive it. The upper part of the body 41 is closed by a removable cap 44 which seats on a gasket 45 and is held by machine screws 46.

Bolted to the lower side of the body 41 is a cup-like member 47 which seats against a gasket 48 and is held by bolts 49. The member 47 encloses the balancing chamber 50. The member 47 is counterbored at its upper margin to receive a cylinder bushing 51 which also seals against the gasket 48. The bushing 51 is formed at its lower margin with an inward and upward extending rim or flange 52 and below this there are arms 53 which support a hub or guide 54. Slidable in the guide 54 is a stem 55 of a piston 56. The piston 56 works in the cylinder bushing 51 and is sealed by the usual snap ring 57. On its lower face it carries a sealing gasket 58 which is held by the retaining disk 59, and this in turn is clamped by a nut 61 screwed on a threaded portion of the stem 55. The normal (running) position of the piston 56 is that shown in Fig. 3, in which the gasket 58 is slightly above the rim 52 and the piston is held in that position by a yielding stop member 62. This stop member is guided in a cup-nut 63 screwed on to the lower end of the hub 54 and is urged upward by a coil compression spring 64.

When the stem 55 engages the member 52 without compressing the spring 64, the piston 56 is held in a position in which the gasket 58 just clears the rim 52. If the pressure on the upper side of the piston 56 overpowers the spring 64 the gasket 58 seals against the rim 52 and precludes leakage past the piston. The purpose of this is to prevent leakage during charging and to restrict the charging flow toward the reservoir 47 to the capacity of the charging port.

Projecting upward from the lower wall of the housing 41 is a boss which is formed with a plurality of apertures, preferably three, one of which appears at 65. These apertures are for the passage of thrust pins 66 which are fixed in the piston 56 and which are provided at their upper ends with two similarly spaced shoulders 67 and 68. The boss is also provided with a central aperture 69 from which lead two atmospheric discharge ports 71, one of which is visible in Fig. 3, and the other of which is forward of the plane of section, but diametrically opposed to the visible port. (See Fig. 2.)

Forced into the aperture 69 is a seat bushing 72 upon which seats a poppet valve 73. Poppet valve 73 has a sealing gasket 74 which is retained by a tubular nut member 75. The upper end of this member 75 serves as the seat for a second or pilot valve 76, which is provided with a sealing gasket 77 retained by a screw 78. The spring 79 reacts against the valve 76 and thus functions to seat both valves 74 and 76. The upper end of the spring 79 is confined by the tubular guide 81 pressed into the cap 44.

The upper shouldered ends of the pin 67 pass through apertures in wings formed on the valves 74 and 76 and the shoulders 67 and 68 are so spaced that after the piston 56 has moved upward a slight distance from running position, the shoulder 68 engages the valve 76. It must unseat this valve before the piston 56 moves far enough for the shoulder 67 to engage and unseat the valve 74. The venting effect of valve 76 ensures rapid motion of the piston upward.

Charging of the chamber 50 is effected by way of a passage 82 which extends through the members 47 and 41 and communicates with the passage 31 in the body 21. In the example illustrated, charging is controlled by the actuating piston of the service vent valve, as will be described. Selection of one or the other pistons to control charging is a matter of choice, except as explained hereinafter.

The service vent valve mechanism includes a body 85, somewhat similar to the body 41 and having a flange which is bolted to the mounting face 27, as indicated at 86. It is provided with an aperture registering with the aperture 28 in the face 26, and there is a strainer 87, identical in form and function with the strainer 43.

The upper part of the body 85 is open and is closed by a cap 88 which seats on a gasket 89 and is held by machine screws 91.

Bolted to the lower side of the body 85 is a cup-like member 92 which in its external dimensions is slightly larger than the member 47, and which encloses the service vent measuring-chamber 100. The member 92 is counterbored at its upper end to receive and support a combined cylinder and valve chamber element 93, which is mounted within the member 92. Member 93 is counterbored to receive and support a cylinder bushing 94. The members 92, 93 and 94 all seal against a gasket 95 interposed between them and the body 85. Connecting bolts are indicated at 96 on Fig. 2.

The body member 93 encloses an upper cylinder space 97 which is in communication with the space within the body 85 and consequently with the brake pipe, and a lower cylinder space 98 which is in direct communication with a valve chamber 99. The spaces 97 and 98 are separated by piston 102, hereinafter described. The chamber 98 is connected with the port 31 by a passage 101 formed partly in the member 93 and partly in the member 85. Thus the communicating spaces 98 and 99 are connected by way of passages 101, 31 and 82 with the balancing chamber 50.

Slidable in the cylinder bushing 94 is a piston 102 which separates the chambers 97 and 98. Piston 102 is urged downward by a light compression spring 103, confined between it and a portion of the member 85. The spring seats at its ends in shallow recesses, as shown.

The piston 102 has a snap ring 104 and is provided with a gasket 105 which at times seats against a rib 106 formed at the lower margin of the bushing 94, the construction being similar to the parts 52 and 58 already described with reference to the piston 56, so that a further detailed description is believed to be unnecessary. The piston 102 has a downwardly extending stem 107 which engages the slidable stop 108. The stem 107 has a shoulder 109 which abuts against the stop 108, and the stop 108 has a central sleeve or hub 111 which rather loosely embraces the extended end of the stem 107 (see Fig. 4). There is a charging port 112 which extends from the piston space 97 through the stem 107 and terminates in a lateral port 113 which in running position (see Fig. 3) is within the sleeve 111 so that the charging rate is limited by the clearance between the sleeve 111 and the stem 107.

Upon the occurrence of a service reduction upward motion of the piston 102 carries the port 113 above the upper margin of the stop 108, permitting back flow to the brake pipe to occur at a somewhat increased rate. The sliding stop 108 is guided in a combined plug and guide 114 screwed into the lower end of the member 93 and sealing this air tight. The stop 108 is urged in an upward direction by a compression spring 115. Its upward motion is limited by collision with the valve chamber bushing 116 which is pressed into the member 93. This bushing is formed with a seat for a slide valve 117. The slide valve 117 is closely confined in a notch in the stem 107 and is urged to its seat by a leaf spring 118.

The valve 117 controls ports in the bushing 116. These ports are three in number. They are, two ports 119 and 121 which communicate by passage 122 with the measuring chamber 100, and a third port 123 which communicates by way of passage 124 and choke 125 with the atmosphere. In the slide valve 117 there is also a through port 126 which when the piston 102 moves to its lowermost position, compressing spring 115, registers with port 121, thus connecting the space 98 and consequently the balancing chamber 50, with the measuring chamber 100. Port 121 is blanked in all other positions of the valve.

There is in the valve 117 also a loop port 127, which in the running position of Fig. 3, connects the ports 119 and 123, so that the measuring chamber 100 is connected to atmosphere through the choke 125. This connection is interrupted if the piston 102 moves downward to its limit of motion. It is also interrupted if the piston 102 moves upward, the disconnection occurring before the brake pipe service vent valve starts to open.

Leading from the measuring chamber 100 is a passage 128, whose capacity is controlled by an interchangeable choke 129. The passage 128 leads to the seat bushing 131 of the service vent valve. This vent valve comprises a pin valve 132, which is loosely mounted in the bushing 133 screwed into the plunger 134. The plunger 134 is guided in a tubular member 135 which is fixed in the cap 88, and is urged in a valve-closing direction by a coil compression spring 136. The pin valve 132 is urged into engagement with the plunger 134 by a light coil spring 137. This pin valve construction will be recognized as similar to the pin valves used in governor tops. Any equivalent pin valve mechanism might be substituted, the idea being to render the pin valve self-alining. The plunger 134 is, at times, forced in an opening direction by thrust pins 138 which are fixed in the piston 102 and extend through openings formed therefor in the lower wall of the housing 85.

For use with the usual pressures and under conditions of operation now standard, the best results are secured by proportioning the parts approximately as stated below, though this is given for illustration and not with the idea of limiting the disclosure to these particular proportions.

The springs 64 and 115 are of such strength that when brake pipe pressure exceeds the pressure in the chamber 50 by approximately 3 pounds per square inch, the pistons 56 and 102 will overpower the springs, seating on the gaskets 58 and 105. The spring 103 is a relatively light spring having little more than sufficient strength to move the piston 102 downward until it engages the yielding stop 108 when pressures above and below the piston 102 are equalized. This spring is used to insure that the piston 102 will move to running position.

The strength of the spring 79 is so chosen that the differential pressure on the valve 73, plus the effect of the spring 79, plus the effect of gravity on the various parts, will require that brake pipe pressure drop 3 pounds below the pressure in the balancing chamber 50 before the valve 76 starts to open.

The aggregate strength of the springs 103 and 136 is such with respect to the differential pressure on the pin valve 132 and the action of gravity on the various parts, that the valve 132 will start to open when brake pipe pressure falls 2 pounds below the pressure in the chamber 50.

The capacity of the measuring chamber 100 is such as to produce a 5 pound per square inch drop in brake pipe pressure when the measuring chamber is connected with the brake pipe.

From the above figures, it follows that valve 132 opens on a 2 pound reduction, and normally produces a further 5 pound reduction, leaving a margin of 1 pound to the reduction necessary to cause the valve 76 to start to open. If a wider margin is necessary the relative strength of spring 79 may be increased.

The ports in the slide valve 117 and its seat, and the port 113 in the stem 107, are so dimensioned and located that when the piston 102 starts to move up, the exhaust connection by way of passage 122 is blanked by the slide valve before pin valve 132 is engaged and before the port 113 rises above the stop 108. The port 113 starts to open above the stop 108 at or about the time the pin valve 132 starts to open. When the port 113 is completely opened its back flow capacity is somewhat more than sufficient to cause pressure in chamber 50 to fall at a service rate.

Operation

Normal recharge

In charging the system at a normal charging rate the parts move to the running position shown in Fig. 3, and the chamber 50 is charged at a rate controlled by the clearance between the hub 111 and the reduced end of stem 107. Under such conditions the measuring chamber 100 is connected to atmosphere by passage 122, ports 119, 127 and 123, passage 124, and choke 125.

Restricted recharge

If brake pipe pressure rises rapidly, as it does at the initiation of release, at the forward portion of the train, the pistons 56 and 102 move downward sealing on their gaskets, so that ports 126 and 121 register, and so that port 127 moves out of register with port 123. Under these conditions balancing chamber 50 is connected with the measuring chamber 100, and the exhaust connection of the measuring chamber 100 is cut off. The increased effective volume of the balancing chamber 50 reduces the tendency to overcharge, and the charging of chamber 100 prevents service venting in the event that piston 102 should move upward and open valve 132 when normal brake pipe pressure is restored while chamber 50 is overcharged.

Service

A two pound brake pipe reduction will cause the piston 102 to move upward first moving the exhaust loop 127 out of register with port 119 and then causing port 113 to begin to clear stop 108 just as or slightly after pin valve 132 starts to open. The opening of pin valve 132 will stimulate the upward motion of the piston increasing the opening of port 113. This increases the back flow from chamber 50 and thus diminishes the tendency of the piston 102 to move upward.

Proper proportioning of the ports permits the attainment of a nicely balanced condition. For example, if response of a plurality of service venting valves on the train pipe tended to produce a sharp reduction of brake pipe pressure, the upward movement of the piston 102 would vent the reservoirs 50 fast enough to cause the piston 102 to move downward once more, thus checking the venting flow. When pressures above and below the piston 102 equalize and the piston moves downward to running position, the measuring chamber 100 is slowly vented to atmosphere so that the service vent can not again function until such a period has elapsed as would preclude the service vent valve from synchronizing with pressure waves in the brake pipe. The choke port 125 is made interchangeable so that this period may be properly determined. The choke 129 is also made interchangeable to control the rate of venting flow from the brake pipe to the measuring chamber.

It will be observed that the piston 102 controls the back flow from the balancing chamber 50 and since the pressure in this chamber also acts on the emergency piston 56 the effective operative differential between the pistons 56 and 102 is maintained at all times. Consequently the use of a single balancing chamber permits the maintenance of the desired relation between the response of the service and emergency mechanism.

Emergency

In the event of a sudden reduction of brake pipe pressure the service vent responds first and starts back flow from the balancing chamber 50, but this can not keep step with the emergency drop of brake pipe pressure. Consequently the piston 56 moves upward and unseats the valve 76. Venting brake pipe pressure through the valve 76 gives further impetus to the upward motion of the piston 56 so that the valve 74 is immediately unseated. The action of the two valves is almost instantaneous, and in emergency applications no time interval between their respective responses can be detected by the ordinary observer. Undoubtedly the service mechanism does respond in advance of the emergency mechanism, but the time interval is negligible for all practical purposes.

Triple valve

The triple valve has not been described in detail and it will suffice to say that its charging function and other functions may follow standard practice.

The accelerating valve mechanism herein disclosed is available for use regardless of the presence of absence of the triple valve. Its sole function is to accelerate the reduction of brake pipe pressure in service without loss of control of such service reduction, and to accelerate a drop of brake pipe pressure in emergency, the brake pipe in emergency being substantially completely vented to atmosphere. These functions permit acceleration of the response of the triple valve throughout the train, but they are not dependent upon the occurrence of the triple valve functions in any degree.

While I have described the preferred embodiment of the invention, and for the reasons stated believe that this has decided advantages, modifications are possible within the broad scope of the invention. For example, it is not strictly necessary that the service piston 102 control charging of chamber 50, but it is better so, for in this way more accurate timing of back flow with reference to service venting is possible. The use of the dual poppet valves 73 and 77 gives less resistance to opening, but a single valve will function and is well known in the vent valve art.

What is claimed is,—

1. A venting mechanism for brake pipes, comprising in combination with a brake pipe, a balancing reservoir; a pair of movable abutments interposed between the brake pipe and said balancing reservoir; means for causing said abutments to respond serially to brake pipe pressure reductions; and brake pipe venting means operable by the response of the first abutment to vent the brake pipe at a service rate and by the response of the second abutment to vent the brake pipe at an increased or emergency rate.

2. An accelerator mechanism for brake pipe reductions, comprising in combination with a brake pipe, a valve for venting the brake pipe at a service rate; another valve for venting the brake pipe at an emergency rate; a balancing reservoir; abutment means subject at all times to the pressure differential between the brake pipe and reservoir, and arranged to operate said valves successively; and means controlled by said abutment means for charging said reservoir from said brake pipe, and for controlling back flow from said reservoir to said brake pipe at a service rate during service reductions of brake pipe pressure.

3. A venting mechanism for brake pipes, comprising in combination with a brake pipe, a balancing reservoir; a pair of movable abutments interposed between the brake pipe and said balancing reservoir; means for causing said abutments to respond serially to brake pipe pressure reductions; brake pipe venting means operable by the response of the first abutment to vent the brake pipe at a service rate and by the response of the second abutment to vent the brake pipe at an increased or emergency rate; and means associated with at least one of said abutments for controlling charging of said reservoir from the brake pipe and back flow from said reservoir to the brake pipe at a service rate.

4. An accelerator mechanism for brake pipe reductions, comprising in combination with a brake pipe; a poppet valve for venting the brake pipe at a service rate; another poppet valve for venting the brake pipe at an emergency rate; a balancing reservoir; abutment means subject at all times to the pressure differential between the brake pipe and reservoir, and arranged to operate said valves successively; and means controlled by said abutment means for charging said reservoir from said brake pipe, and for controlling back flow from said reservoir to said brake pipe at a service rate during service reduction of brake pipe pressure.

5. An accelerator mechanism for brake pipe reductions, comprising in combination with a brake pipe, a measuring chamber; a poppet valve for controlling venting flow from the brake pipe to the measuring chamber; another valve for venting the brake pipe at an emergency rate; a balancing reservoir; abutment means subject at all times to the pressure differential between the brake pipe and balancing reservoir and arranged to operate said valves successively; and means controlled by said abutment means for charging said reservoir from said brake pipe and for controlling back flow from said reservoir to said brake pipe at a service rate during service reductions of brake pipe pressure.

6. An accelerator mechanism for brake pipe reductions, comprising in combination with a brake pipe, a valve for venting the brake pipe at a service rate; another valve for venting the brake pipe at an emergency rate; a balancing reservoir; movable abutments, each connected to operate a corresponding one of said valves, and each subject in one direction to brake pipe pressure and in the opposite direction to pressure in said reservoir; means for causing said abutments each to respond to a different rate of brake pipe reduction; and means controlled by one of said abutments for charging said reservoir from said brake pipe.

7. An accelerator mechanism for brake pipe reductions, comprising in combination with a brake pipe, a valve for venting the brake pipe at a service rate; another valve for venting the brake pipe at an emergency rate; a balancing reservoir; movable abutments, each connected to operate a corresponding one of said valves, and each subject in one direction to brake pipe pressure and in the opposite direction to pressure in said reservoir; means for causing said abutments each to respond to a different rate of brake pipe reduction; and means controlled by one of said abutments for charging said reservoir from said brake pipe and for controlling back flow from said reservoir to said brake pipe at a service rate.

8. The combination of claim 7, further characterized in that both valves are of the poppet type and close in the direction of venting flow.

9. The combination of claim 7, further characterized in that both valves are of the poppet type, and the service venting valve discharges into a measuring chamber.

10. An accelerator mechanism for service reductions of brake pipe pressure, comprising in combination with a brake pipe, a valve for venting the brake pipe; a measuring chamber into which said valve discharges; a balancing reservoir and movable abutment for operating said valve and subject in one direction to brake pipe pressure and in the other direction to pressure in said reservoir; means controlled by said abutment for controlling charging of said reservoir when said vent valve is closed and back flow from said reservoir to said brake pipe at a service rate when said vent valve is open; and valve means actuated by said abutment and serving to connect said measuring chamber with atmosphere when said vent valve is closed and to close said connection when said vent valve is open.

11. The combination of claim 10, further characterized in that the connection from said measuring chamber to atmosphere, controlled by said valve means, is restricted.

12. An accelerator mechanism for service reductions of brake pipe pressure, comprising in combination with a brake pipe, a valve for venting the brake pipe; a measuring chamber into which said valve discharges; a balancing reservoir; a movable abutment for operating said valve and subject in one direction to brake pipe pressure and in the other direction to pressure in said reservoir; means controlled by said abutment for controlling charging of said reservoir when said vent valve is closed and back flow from said reservoir to said brake pipe at a service rate when said vent valve is open; and valve means actuated by said abutment and serving to connect said measuring chamber with atmosphere when said vent valve is closed and to close said connection when said vent valve is open, and upon excessive rise of brake pipe pressure serving to connect said reservoir and chamber and interrupt the connection from said chamber to atmosphere.

13. The combination with the structure defined in claim 10, of an emergency vent mechanism comprising a valve serving to control an emergency vent from the brake pipe, and an abutment for actuating the same, said abutment being subject in opposing directions to brake pipe pressure and pressure in said balancing reservoir.

14. The combination with the structure defined in claim 12, of an emergency vent mechanism comprising a valve serving to control an emergecy vent from the brake pipe, and an abutment for actuating the same, said abutment being subject in opposing direction to brake pipe pressure and pressure in said balancing reservoir.

15. An accelerator mechanism for brake pipe reductions, comprising in combination with a brake pipe, a valve for venting the brake pipe; at a service rate; a measuring chamber into which said valve discharges; a valve for venting the brake pipe at an emergency rate; a balancing reservoir; movable abutments, one for operating each of said valves and each subject in one direction to brake pipe pressure, and in the opposite direction to pressure in said reservoir; means for causing said abutments each to respond to a different rate of brake pipe reduction; means controlled by one of said abutments for charging said reservoir from said brake pipe and for controlling back flow from said reservoir to said brake pipe at a service rate; and valve means actuated by one of said abutments and serving to open and close a vent from said measuring chamber.

16. An accelerator mechanism for brake pipe reductions, comprising in combination with a brake pipe, a valve for venting the brake pipe at a service rate; a measuring chamber into which said valve discharges; a valve for venting the brake pipe at an emergency rate; a balancing reservoir; movable abutments, one for operating each of said valves and each subject in one direction to brake pipe pressure, and in the opposite direction to pressure in said reservoir; means for causing said abutments each to respond to a different rate of brake pipe reduction; means controlled by one of said abutments for charging said reservoir, and for controlling flow from said reservoir to said brake pipe at a service rate; and valve means actuated by one of said abutments and serving to open and close a vent from said measuring chamber, and upon excesive rate of rise of brake pipe pressure, serving to connect said reservoir and chamber.

17. An accelerator mechanism for brake pipe reductions, comprising in combination with a brake pipe, a valve for venting the brake pipe; a measuring chamber into which said valve discharges; a balancing reservoir; a movable abutment for operating said valve, and subject in one direction to brake pressure and in the other direction to pressure in said reservoir; a retard stop for arresting said piston in normal charging but capable of yielding under excessive rise of brake pipe pressure to permit the piston to move to an abnormal position; means controlled by said piston for regulating charging of said reservoir and back flow therefrom at a service rate to the brake pipe; and a valve actuated by said piston and serving in normal position to open a vent from said measuring chamber, and in abnormal position to close said vent and connect said chamber with said reservoir.

18. The combination of claim 17, further characterized in that the brake pipe vent valve is of the poppet type.

19. The combination of claim 17, further characterized in that the vent from said measuring chamber is restricted.

20. The combination with the structure defined in claim 17, of a second valve for venting the brake pipe to atmosphere at an emergency rate, and an abutment for actuating said valve, said abutment being subject in opposing directions to brake pipe pressure and the pressure in said balancing reservoir.

21. The combination with a brake pipe vent mechanism of the type in which an actuating piston is balanced between brake pipe pressure and pressure in a reservoir, and upon a fall of brake pipe pressure actuates a vent valve to vent the brake pipe into a closed measuring chamber, and thereafter, upon equalization of brake pipe and reservoir pressures, vents said chamber, of yielding means permitting motion of said piston to an abnormal position upon an excessive rise of brake pipe pressure; and means actuated by such motion and serving to close the measuring chamber vent and connect said chamber with said reservoir.

22. The combination with the structure defined in claim 21, of a valve controlling the venting of brake pipe to atmosphere at an emergency rate, and an abutment for actuating said valve, said abutment being subject in opposing directions to brake pipe pressure and pressure in said reservoir.

23. The combination of claim 12, further characterized in that the valve which vents the brake pipe is of the poppet type, and the valve means defined in the closing element of the claim is a slide valve.

24. The combination of claim 16, further characterized in that each valve which vents the brake pipe is of the poppet type, and the valve means defined in the closing element of the claim is a slide valve.

25. The combination of claim 17, further characterized in that the "valve actuated by said piston" defined in the closing element of the claim is a slide valve.

26. The combination of claim 21, further characterized in that the "means actuated by such motion" and defined in the closing element of the claim is a slide valve.

27. A vent valve mechanism for brake pipes, comprising two piston-actuated vent valves, having different venting discharge characteristics; a single balancing reservoir, each piston being interposed between the brake pipe and said balancing reservoir; and means for causing said piston-actuated valves to respond serially to brake pipe pressure reductions.

28. The combination of claim 27, further characterized in that the means for causing the piston-actuated valves to respond serially involves the use of loading means of different intensity.

29. A vent valve mechanism for brake pipes, comprising two piston-actuated vent valves, said valves being of the poppet type and of different port areas; a single balancing reservoir, each piston being interposed between the brake pipe and said balancing reservoir; and means for causing said piston-actuated valves to respond serially to brake pipe pressure reductions.

30. The combination of claim 29, further characterized in that the means for causing said piston-actuated valves to respond serially involves the use of loading means of different intensity, the valve of smaller port area being more lightly loaded.

31. The combination of claim 29, further characterized in that the piston-actuated vent valve of smaller port area discharges into a measuring chamber, and the means for causing said piston-actuated valves to respond serially involves the use of loading means of different instensity, the valve of smaller port area being more lightly loaded.

32. The combination of claim 27 further characterized in that the piston-actuated valve which first responds, discharges into a measuring chamber.

33. An accelerator mechanism for brake pipe reductions, comprising in combination with a brake pipe, a poppet valve for venting the brake pipe at a service rate; another poppet valve for venting the brake pipe at an emergency rate; a balancing reservoir; and a pair of movable abutments subject in opposite directions to pressures in the brake pipe and reservoir, and arranged to operate said valves successively.

34. An accelerator mechanism for brake pipe reductions, comprising in combination with a brake pipe, a valve for venting the brake pipe at a service rate; a balancing reservoir; a movable abutment connected to operate said valve and subject in valve closing direction to brake pipe pressure and in valve opening direction to the pressure in said balancing reservoir; and throttling means variably adjusted by motion of said abutment and controlling communication between the brake pipe and balancing reservoir, said throttling means being arranged to permit a limited charging rate when said valve is closed, back flow from the reservoir to the brake pipe at a service rate when said valve is opened by a service rate reduction, and back flow at a somewhat greater rate when a service rate of reduction is exceeded.

35. The combination of claim 34 further characterized in that the valve for venting the brake pipe is a poppet valve.

36. The combination with the structure defined in claim 34, of a measuring chamber into which said vent valve discharges; a yielding stop which said abutment overpowers upon excessive rise of brake pipe pressure; and a second valve actuated by said abutment, said valve controlling an exhaust from the measuring chamber and a connection between the measuring chamber and balancing reservoir, and being so arranged that said exhaust is open when the abutment engages said stop without overpowering it, and said connection is opened and said exhaust closed when said yielding stop is overpowered.

37. The combination with the structure defined in claim 34, of a measuring chamber into which said vent valve discharges; a yielding stop which said abutment overpowers upon excessive rise of brake pipe pressure; a second valve actuated by said abutment, said valve controlling an exhaust from the measuring chamber and a connection between the measuring chamber and balancing reservoir, and being so arranged that said exhaust is open when the abutment engages said stop without overpowering it, and said connection is opened and said exhaust closed when said yielding stop is overpowered; and an emergency vent mechanism comprising a valve serving to control an emergency vent from the brake pipe, and an abutment for actuating the same, said abutment being subject in opposing directions to brake pipe pressure and to pressure in said balancing reservoir.

38. The combination with the structure defined in claim 34 of an emergency vent mechanism comprising a valve serving to control an emergency vent from the brake pipe, and an abutment for actuating the same, said abutment being subject in opposing directions to brake pipe pressure and to pressure in said balancing reservoir.

CHARLES A. CAMPBELL.

CERTIFICATE OF CORRECTION.

Patent No. 1,957,692.                                                                May 8, 1934.

CHARLES A. CAMPBELL.

It is hereby certified that error appears in the printed specification of the above numbered patent requiring correction as follows: Page 5, line 119, claim 4, for "reduction" read reductions; page 6, line 118, claim 16, for "excesive" read excessive; and line 126, claim 17, after "brake" insert pipe; page 7, line 72, claim 31, for "instensity" read intensity; and that the said Letters Patent should be read with these corrections therein that the same may conform to the record of the case in the Patent Office.

Signed and sealed this 19th day of June, A. D. 1934.

Bryan M. Battey (Seal)                                                Acting Commissioner of Patents.